United States Patent
Bucsan et al.

(10) Patent No.: US 11,099,021 B2
(45) Date of Patent: Aug. 24, 2021

(54) SYSTEM AND METHOD FOR ROUTING A VEHICLE

(71) Applicant: TOYOTA MOTOR ENGINEERING & MANUFACTURING NORTH AMERICA, INC., Erlanger, KY (US)

(72) Inventors: George C. Bucsan, Belleville, MI (US); Jae Seung Lee, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 141 days.

(21) Appl. No.: 15/730,397

(22) Filed: Oct. 11, 2017

(65) Prior Publication Data

US 2019/0107407 A1    Apr. 11, 2019

(51) Int. Cl.
*G01C 21/34*      (2006.01)
*G06Q 10/04*      (2012.01)
*G06F 16/29*      (2019.01)

(52) U.S. Cl.
CPC ..... *G01C 21/3469* (2013.01); *G01C 21/3446* (2013.01); *G01C 21/3461* (2013.01);
(Continued)

(58) Field of Classification Search
CPC .......... G09B 29/106; G06Q 10/08355; G06Q 10/047; G06F 16/29; B63B 51/00
(Continued)

(56) References Cited

U.S. PATENT DOCUMENTS 6,542,815 B1 *  4/2003  Ishizaki ............. G01C 21/3461
                                                340/990
7,945,383 B2    5/2011  Tu et al.
(Continued)

FOREIGN PATENT DOCUMENTS

JP    2011-33509 A     2/2011
JP    2014240757   *  12/2014

OTHER PUBLICATIONS

Rui Ma, Xuegang Ban, W.Y. Szeto, "Emission Modeling and Pricing in Dynamic Traffic Networks", 2015, Transportation Research Procedia (Elsevier), 9, pp. 106-129 (Year: 2015).*

*Primary Examiner* — Yuen Wong
*Assistant Examiner* — Hongye Liang
(74) *Attorney, Agent, or Firm* — Oblon, McClelland, Maier & Neustadt, L.L.P

(57) ABSTRACT

An apparatus, a method, and a non-transitory computer readable medium for routing a vehicle are provided. The apparatus includes processing circuitry that is configured to receive a current location of the vehicle, routing information including a destination and at least a dynamic wireless power transmission characteristic or an emission characteristic of the vehicle, and a map database. The processing circuitry is further configured to generate one or more routes between the current location and the destination; determine a route cost for each one of the one or more routes wherein the route cost includes the weighted summation of multiple routing factors including a route time and at least a route factor based on the dynamic wireless power transmission characteristic or the emission characteristic of the vehicle; and select a route out of the one or more routes based on route selection criteria.

19 Claims, 5 Drawing Sheets

(52) U.S. Cl.
CPC .......... *G06F 16/29* (2019.01); *G06Q 10/047* (2013.01); *B60W 2556/50* (2020.02)

(58) Field of Classification Search
USPC ........................................................ 701/533
See application file for complete search history.

(56) References Cited

U.S. PATENT DOCUMENTS

| | | | |
|---|---|---|---|
| 8,301,323 B2* | 10/2012 | Niwa | B60W 20/12 |
| | | | 701/22 |
| 8,706,409 B2* | 4/2014 | Mason | G06Q 10/0833 |
| | | | 701/424 |
| 9,097,547 B2 | 8/2015 | Garg et al. | |
| 9,135,764 B2 | 9/2015 | Ricci | |
| 9,217,646 B2 | 12/2015 | Kornhauser et al. | |
| 2009/0005974 A1 | 1/2009 | Lenneman et al. | |
| 2010/0036606 A1* | 2/2010 | Jones | G01C 21/3446 |
| | | | 701/533 |
| 2011/0246246 A1* | 10/2011 | Johnson | G06Q 10/02 |
| | | | 705/5 |
| 2016/0364454 A1 | 12/2016 | Yang et al. | |
| 2017/0276492 A1* | 9/2017 | Ramasamy | G01C 21/34 |
| 2018/0037136 A1* | 2/2018 | Nelson | B60L 5/005 |

\* cited by examiner

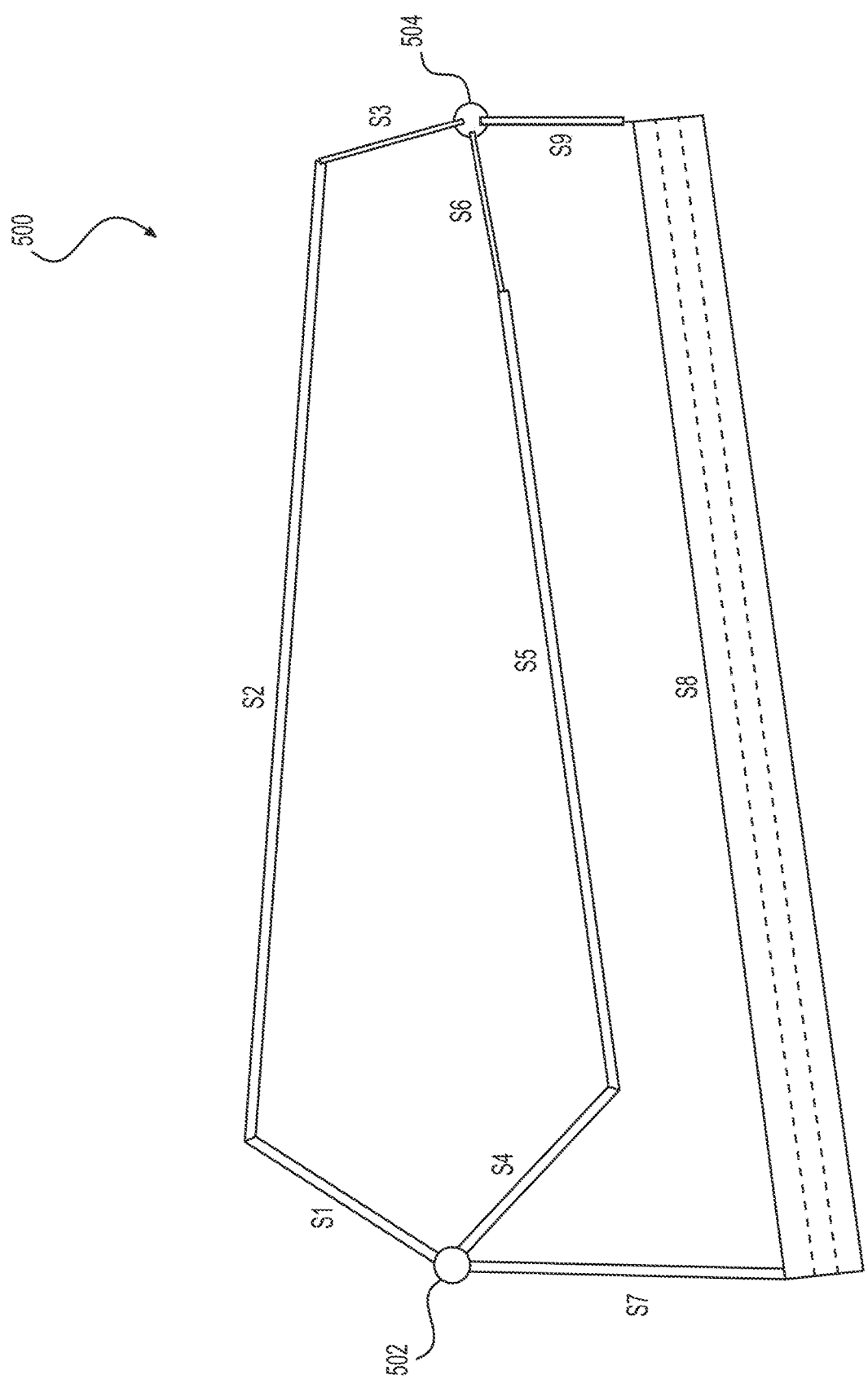

SYSTEM AND METHOD FOR ROUTING A VEHICLE

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Vehicle routing methods can be used to route a vehicle from one location to another location. In an example, U.S. Pat. No. 9,217,646 B2 discloses a system and method to detect if an object, person, or vehicle has deviated from its prescribed route, and guide it back to the prescribed route, according to criteria predefined by a controlling authority or authorities.

SUMMARY

According to an embodiment of the present disclosure, there is provided an apparatus for routing a vehicle. The apparatus includes processing circuitry that is configured to receive a current location of the vehicle, routing information including a destination and at least a dynamic wireless power transmission (DWPT) characteristic or an emission characteristic of the vehicle, and a map database. The processing circuitry is further configured to generate one or more routes between the current location and the destination; determine a route cost for each one of the one or more routes wherein the route cost includes the weighted summation of multiple routing factors including a route time and at least a route factor based on the DWPT characteristic or the emission characteristic of the vehicle; and select a route out of the one or more routes based on route selection criteria.

According to an embodiment of the present disclosure, there is provided a method of routing a vehicle. The method includes receiving a current location of the vehicle, routing information including a destination and at least a DWPT characteristic or an emission characteristic of the vehicle, and a map database. The method further includes generating one or more routes between the current location and the destination; determining a route cost for each one of the one or more routes wherein the route cost includes the weighted summation of multiple routing factors including a route time and at least a route factor based on the DWPT characteristic or the emission characteristic of the vehicle; and selecting a route out of the one or more routes based on route selection criteria.

According to an embodiment of the present disclosure, there is provided a non-transitory computer readable storage medium having instructions stored thereon that when executed by processing circuitry causes the processing circuitry to perform a method. The method includes receiving a current location of the vehicle, routing information including a destination and at least a DWPT characteristic or an emission characteristic of the vehicle, and a map database. The method further includes generating one or more routes between the current location and the destination; determining a route cost for each one of the one or more routes wherein the route cost includes the weighted summation of multiple routing factors including a route time and at least a route factor based on the DWPT characteristic or the emission characteristic of the vehicle; and selecting a route out of the one or more routes based on route selection criteria.

BRIEF DESCRIPTION OF THE DRAWINGS

Various embodiments of this disclosure that are proposed as examples will be described in detail with reference to the following figures, wherein like numerals reference like elements, and wherein:

FIG. 5 shows an example 500 according to an embodiment of the disclosure.

DETAILED DESCRIPTION

The following description relates to an apparatus, a method, and a non-transitory medium to determine a route for a vehicle between a current location and a destination. The route can be determined by calculating a route cost using a weighted formula based on multiple routing factors and selecting the route based on route selection criteria. Each factor is associated with a weight. Both the factors and the weights are based on routing information such as vehicle and road characteristics, user preferences, real-time traffic information. At least one routing factor is based on a dynamic wireless power transmission (DWPT) characteristic or an emission characteristic of the vehicle.

Figure 1:
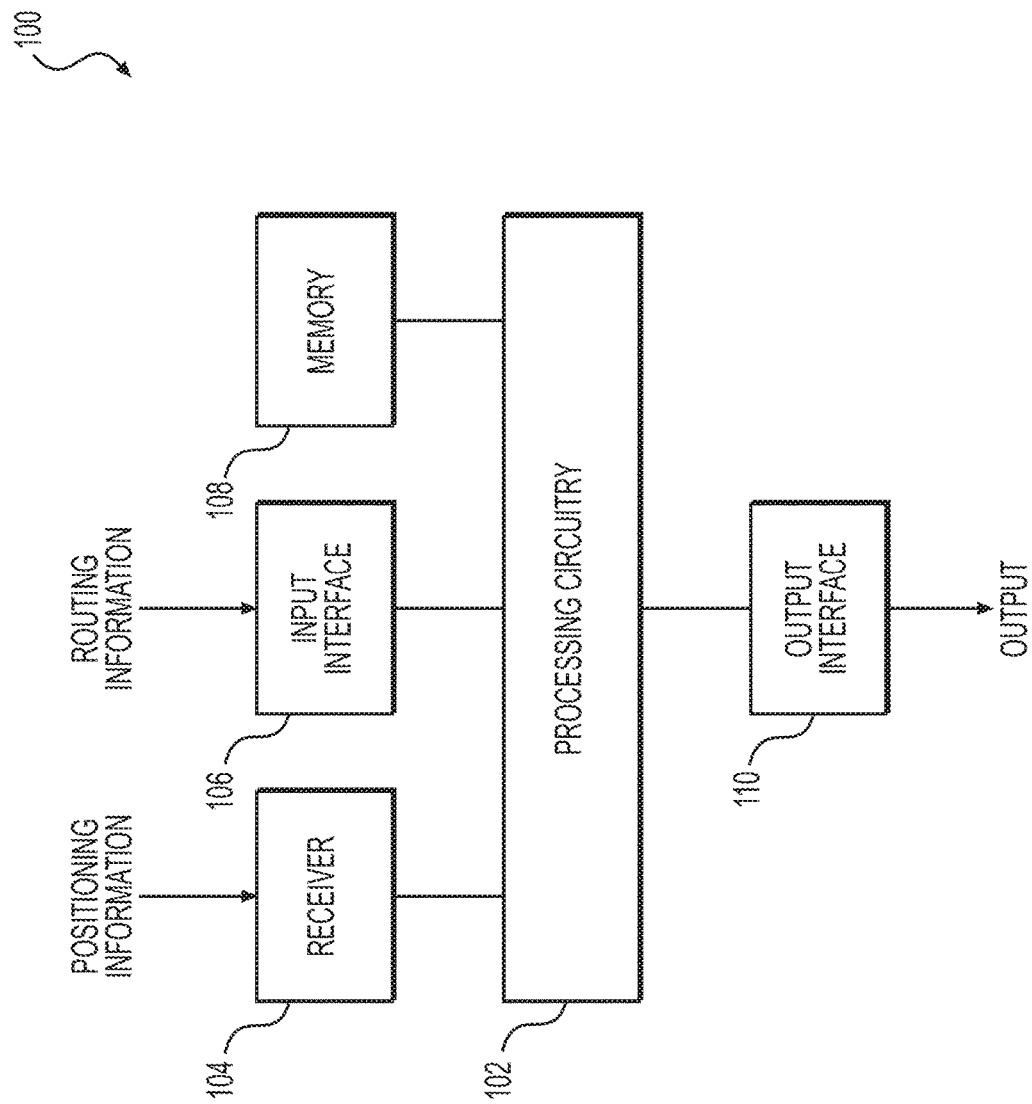
FIG. 1 is a schematic of an apparatus 100 according to an embodiment of the disclosure.

FIG. 1 is a schematic of an apparatus 100 according to an embodiment of the disclosure. The apparatus 100 includes processing circuitry 102, a receiver 104, an input interface 106, a memory 108, and an output interface 110. The processing circuitry 102 is configured to receive a current position of a vehicle, routing information including a destination, and a map database from the receiver 104, the input interface 106, and the memory 108, respectively. Subsequently, the processing circuitry 102 is configured to determine a route between the current location of the vehicle and the destination based on the routing information using the map database. The processing circuitry 102 is configured to send the route to the output interface 110. The output interface 110 is configured to output the route to a user of the vehicle.

The receiver 104 is configured to receive positioning information of a vehicle. The positioning information can be from various satellite-based positioning systems such as a global positioning system (GPS). A current location of the vehicle can be determined based on the positioning information by the receiver 104. In one embodiment, the current location can be a physical address, the latitude and longitude coordinates of a geographic coordinate system used by satellite-based positioning systems a GPS, and the like. The receiver 104 is configured to send the current location of the vehicle to the processing circuitry 102.

The input interface 106 is configured to receive and send routing information to the processing circuitry 102. The input interface 106 can be an individual device or an integration of multiple devices such as a touch screen, a keyboard, a keypad, a mouse, a joystick, a microphone, a universal series bus (USB) interface, an optical disk drive, a wireless receiver, and the like. The input interface 106 can also include a controller that convert the routing information into electrical signals and send the electrical signals to the processing circuitry 102.

Routing factors and weights used to determine a route cost are based on routing information. In one embodiment, the routing information includes a destination, vehicle and road characteristics, user preferences, real-time traffic information, fuel prices, battery charging prices, and the like. The destination can be a physical address, the latitude and longitude coordinates of a geographic coordinate system used by satellite-based positioning systems such as the GPS, and the like.

The vehicle characteristics can be based on an energy source, a DWPT characteristic, emission characteristic, and the like of a vehicle. The energy source of the vehicle can be gasoline, compressed hydrogen, battery, and the like. A vehicle can be an all battery electric vehicle (AEV) and a non-AEV such as a gasoline powered vehicle or a fuel cell powered vehicle. Note that an AEV derives all the energy from a battery pack or battery packs which can be externally charged. DWPT characteristic refers to charging a DWPT enabled vehicle wirelessly while the DWPT enabled vehicle is moving on a DWPT enabled road. The DWPT enabled vehicle and the DWPT enabled road have the hardware and software to enable electrical power being transferred to the DWPT enabled vehicle from the DWPT enabled road. A vehicle can be categorized into a DWPT enabled vehicle and a non-DWPT enabled vehicle based on the DWPT characteristic. The emission characteristic refers to a vehicle emitting emissions such as carbon dioxide, ozone, carbon monoxide, mono-nitrogen oxides, and the like. A vehicle can be categorized into an emission vehicle and a zero emission vehicle based on the emission characteristic. A zero emission vehicle emits none of the above emissions. An emission vehicle emits at least one of the above emissions. For example, an AEV is a zero emission vehicle; a gasoline powered vehicle can be an emission vehicle.

The road characteristics are based on a DWPT characteristic, emission fees, congestion fees, tolls, and the like. A DWPT enabled road is associated with an infrastructure which enables electrical power being transferred to an AEV moving on the road from the infrastructure. An emission fee is imposed on an emission vehicle moving on an emission road. No emission fee is imposed on a zero emission vehicle. A congestion fee and/or tolls are imposed on a vehicle moving on a congestion-toll road.

The memory 108 is configured to store a map database including road maps. The map database can also include a subset or all of the routing information. In one embodiment, information in the memory 108 can be modified by processing circuitry 102. The memory 108 can be a non-volatile storage medium. In another embodiment, the memory 108 includes both non-volatile and volatile storage media. In one embodiment, a portion of the memory 108 can be integrated into the processing circuitry 102. The memory 108 can be located remotely and communicate with the processing circuitry 102 via a wireless communication protocol.

The processing circuitry 102 is configured to receive a current location of a vehicle, routing information, and a map database from a receiver 104, an input interface 106, and a memory 108, respectively. The processing circuitry 102 is configured to generate one or more routes between the current location and the destination using the routing information and the map database; determine a route cost for each route using a weighted formula based on multiple factors wherein at least one factor is based on a DWPT characteristic or an emission characteristics of a vehicle; select the route based on route selection criteria; and output the route to an output interface 110.

The output interface 110 is configured to receive a route from a processing circuitry 102 and send the route to a user of a vehicle. The output interface 110 can include an individual device or an integration of multiple devices such as a display device, a speaker, a wireless transmitter, and the like. The output interface 110 can also include a controller that convert electrical signals from the processing circuitry 102 to appropriate signals such as visual signals used by a display device, audio signals used by a speaker, and the like.

In another embodiment, a subset or all of a routing information and a map database come from one or more devices such as an input interface 106 and a memory 108. For example, the memory 108 can store vehicle and road characteristics, user preferences, gasoline prices, battery charging prices, and the like. A map database can also come from an input interface 106.

One or more of a processing circuitry 102, a receiver 104, an input interface 106, and a memory 108 can be made by discrete devices or integrated devices. The circuits for one or more of the processing circuitry 102, the receiver 104, the input interface 106, and the memory 108, can be made by discrete circuits, one or more integrated circuits, application-specific integrated circuits (ASICs). The processing circuitry 102 can also be a central processing unit (CPU).

In one embodiment, a receiver 104 receives positioning information from a GPS, determines a current location of a vehicle, and sends the current location of the vehicle to processing circuitry 102. An input interface receives routing information including a destination, vehicle and road characteristics and user preferences and sends the routing information to the processing circuitry 102. A memory 108 stores a map database and sends the map database to the processing circuitry 102. The processing circuitry 102 receives the current location of the vehicle, the routing information, and the map database from the receiver 104, the input interface 106, and the memory 108, respectively. The processing circuitry 102 is configured to generate one or more routes between the current location and the destination using the routing information and the map database; determine a route cost for each route using a weighted formula based on multiple factors wherein at least one factor is based on a DWPT characteristic or an emission characteristics of a vehicle; select the route based on route selection criteria; and output the route to an output interface 110.

Figure 2:
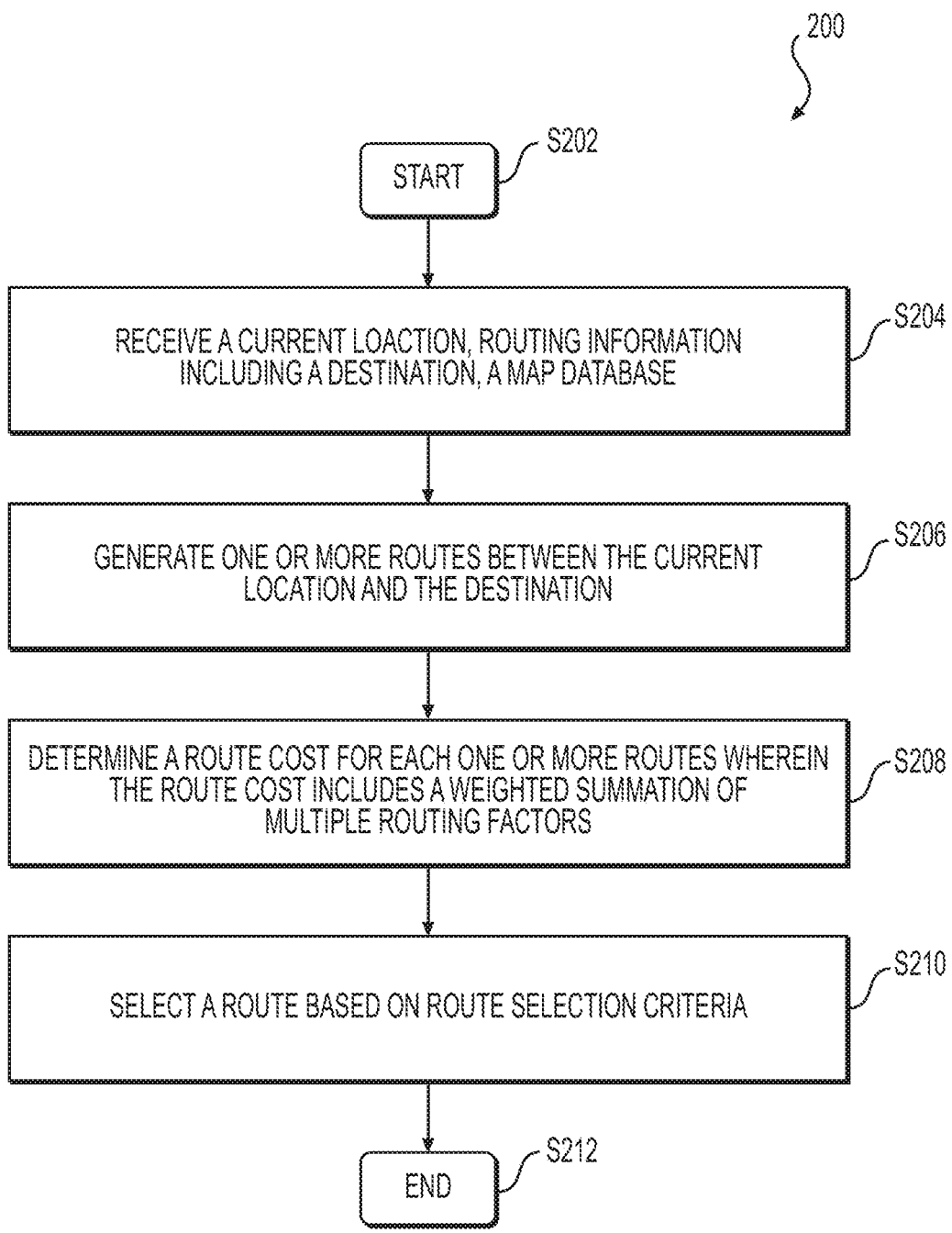
FIG. 2 is a flowchart outlining a vehicle routing method 200 according to an embodiment of the disclosure.

FIG. 2 is a flowchart outlining a vehicle routing method 200 according to an embodiment of the disclosure. The method 200 can be used to determine a route between a current location of a vehicle and a destination based on routing information using a map database. In a road network including one or more roads and one or more intersections, a segment is a road between two neighboring intersections. A route between the current location of the vehicle and the destination includes one or more segments. The method starts at S202.

At S204, a current location of a vehicle, routing information including a destination, and a map database are received by the processing circuitry 102.

At S206, k (k is an integer that is larger than or equal to 1) routes are generated between the current location and the destination based on a map database. In one embodiment, the k routes between the current location and the destination can be generated by "k shortest path routing" algorithms based on Dijkstra's algorithm, Bellman Ford algorithm, and the like, where a route with the shortest distance and (k−1) other routes in non-decreasing order of distance are generated.

At S208, a route cost is determined for each of the k routes. The route cost can be determined based on one or more factors. Each factor is associated with a weight. In one embodiment, the unit of the route cost is the US dollar $. The route cost can be a weighted summation of one or more factors as follows $$\text{route cost} = \Sigma_i \text{ route factor } i \times \text{weight } i = \text{route factor } 1 \times \text{weight } 1 + \text{route factor } 2 \times \text{weight } 2 + \ldots \quad (1),$$

where route factor i can be a route time, a route DWPT factor, a route energy, a route emission factor, and a route congestion-toll; the associated weight i can be a time weight, a DWPT weight, an energy weight, an emission weight, and a congestion-toll weight, respectively. Therefore, the route cost can include one or more cost terms where each cost term can be a multiplication of a factor and an associated weight, such as a route time cost, a route DWPT cost, a route energy cost, a route emission cost, and a route congestion-toll cost. In another embodiment, a cost term can include a weighted summation. For example, an emission vehicle emits two emissions, carbon dioxide ($CO_2$) and carbon monoxide (CO) when moving on an emission road. The route emission cost is the summation of a $CO_2$ factor multiplied by a $CO_2$ weight and a CO factor multiplied by a CO weight.

A route time is the total amount of time that a vehicle spends in a route including a route driving time and a route non-driving time. The route driving time is the total amount of time that the vehicle spends in moving from a current position to a destination. The non-driving time is the amount of time that the vehicle is not moving, such as at a gas station, at a resting area, and the like. A time weight can be a user preference from an input interface 106 with a unit of dollar per unit time.

A route DWPT factor is used to promote the usage of DWPT enabled roads by vehicles enabled to use and needing DWPT. The route DWPT factor is also used to discourage vehicles not using DWPT from travelling on DWPT enabled roads. In one embodiment, the route DWPT factor is represented by a route DWPT time. The route DWPT time is the total amount of time spent in a first case when a vehicle does not use DWPT and the vehicle travels on DWPT enabled roads or in a second case when the vehicle is enabled to use and needs DWPT and the vehicle travels on non-DWPT enabled roads. In the first case, a DWPT weight can be a fee imposed on the vehicle. In the second case, a DWPT weight can be a user preference. In both cases, the unit of the DWPT weights can be dollar per unit time.

Route energy $E_{route}$ is the total amount of energy that a vehicle consumes in a route. Segment energy is the amount of energy that the vehicle consumes in a segment. The segment energy can be calculated using mathematical models based on vehicle characteristics, a map database, and the like. The route energy is the summation of all segment energies in the route. The unit of the route and segment energies can be kilowatts hour (kWh) for an AEV, a liter for a gasoline powered vehicle, and the like. An energy weight can be a unit price for the energy at a charging station, via DWPT, or at a gas station with a unit such as $/kWh, $/liter, and the like.

In one embodiment, a route emission factor can be represented by a route emission mass. The route emission mass is the amount of mass of a kind of emission emitted by an emission vehicle traveling in an emission road. The unit of the emission mass can be kilograms (kg). An emission weight can be a road characteristic such as a fee imposed on the emission vehicle with a unit of $/kg. When the emission vehicle emits $N_e$ ($N_e \geq 1$) emissions, the route emission masses of $N_e$ emissions need to be determined.

A route congestion-toll is a summation of all congestion fees and tolls imposed on a vehicle in a route. A congestion-toll weight can be set to 1 if the route includes at least one segment where a congestion fee or a toll is imposed on a vehicle.

Note that a subset of routing weights such as an energy weight and an emission weight are based on unit prices of energy or fees imposed on a vehicle. In one embodiment, a user can overwrite any routing weight based on a vehicle or road characteristic with a user preference, i.e. a route weight entered by the user.

In one embodiment, a route cost includes a weighted summation of a route time and at least one of a route DWPT factor or route emission factor. For example, a route cost includes a weighted summation of a route time and a route DWPT time. In another example, a route cost includes a weighted summation of a route time, a route DWPT time, route energy, one or more route emission masses, and a route congestion-toll.

At S210, a route out of the k routes is selected based on route selection criteria such as a lowest route cost. In one embodiment, a route having the lowest route cost is selected. Then the method proceeds to S212 and terminates.

A route cost can be determined at a current location of a vehicle and before the vehicle arrives at a destination. Therefore, a routing information and a map database used to determine the route cost can be different from the actual vehicle and road characteristics, fuel prices, battering charging price, real-time traffic information, and the like when the vehicle is travelling from the current location to the destination. Unless otherwise noted, the route cost is determined based on the routing information and the map database that the processing circuitry 102 receives from the input interface 106 and the memory 108. In one embodiment, the processing circuitry 102 can receive the routing information and the map database continuously and the updated routing information and the map database can be used in determining the route cost. In one embodiment, real-time traffic information can be used in S206, or S208, or S206 and S208.

Note that method 200 can be implemented using a different order than that shown in FIG. 2. For example, a processing circuitry 102 has received a current location of a vehicle, a destination, and a map database at S204. Additional routing information such as tolls is still being received by the processing circuitry 102. The processing circuitry 102 can start S206 after receiving the current location of the vehicle, the destination, and the map database, resulting in a parallel processing of S206 and a part of S204. Method 200 can be implemented using processing circuitry 102.

At S208 of method 200, a route cost of each of the k routes can be determined using various methods. In one embodiment shown in FIG. 3, a subset of routing factors can be determined in each segment that contributes to one or more of the k routes. The segment routing factors are stored separately. Subsequently, a route cost for each of the k routes can be determined using the segment routing factors and routing information, as shown in FIG. 4.

Figure 3:
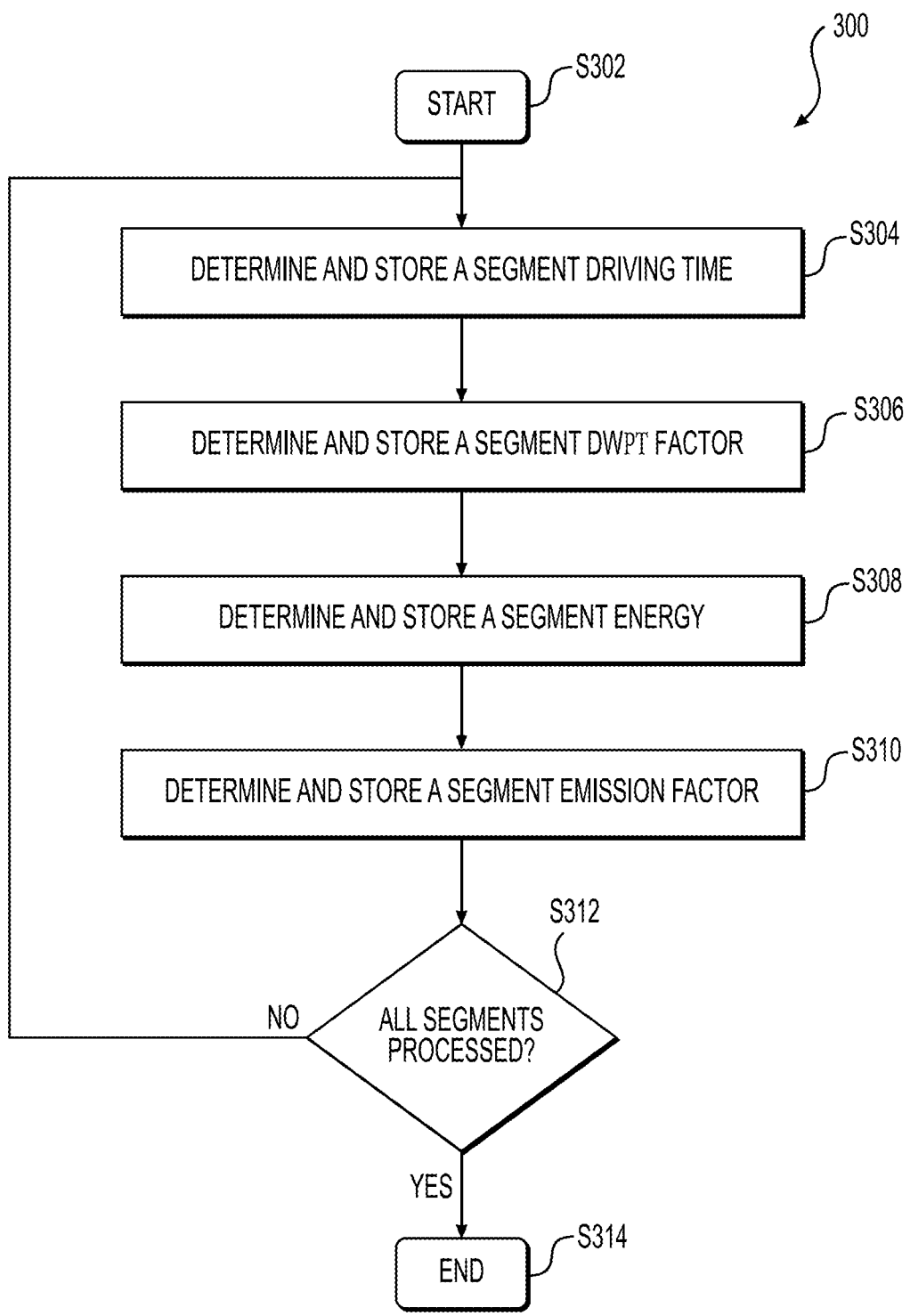
FIG. 3 is a flowchart outlining a method 300 to determine routing factors for one or more segments according to an embodiment of the disclosure.
Figure 4:
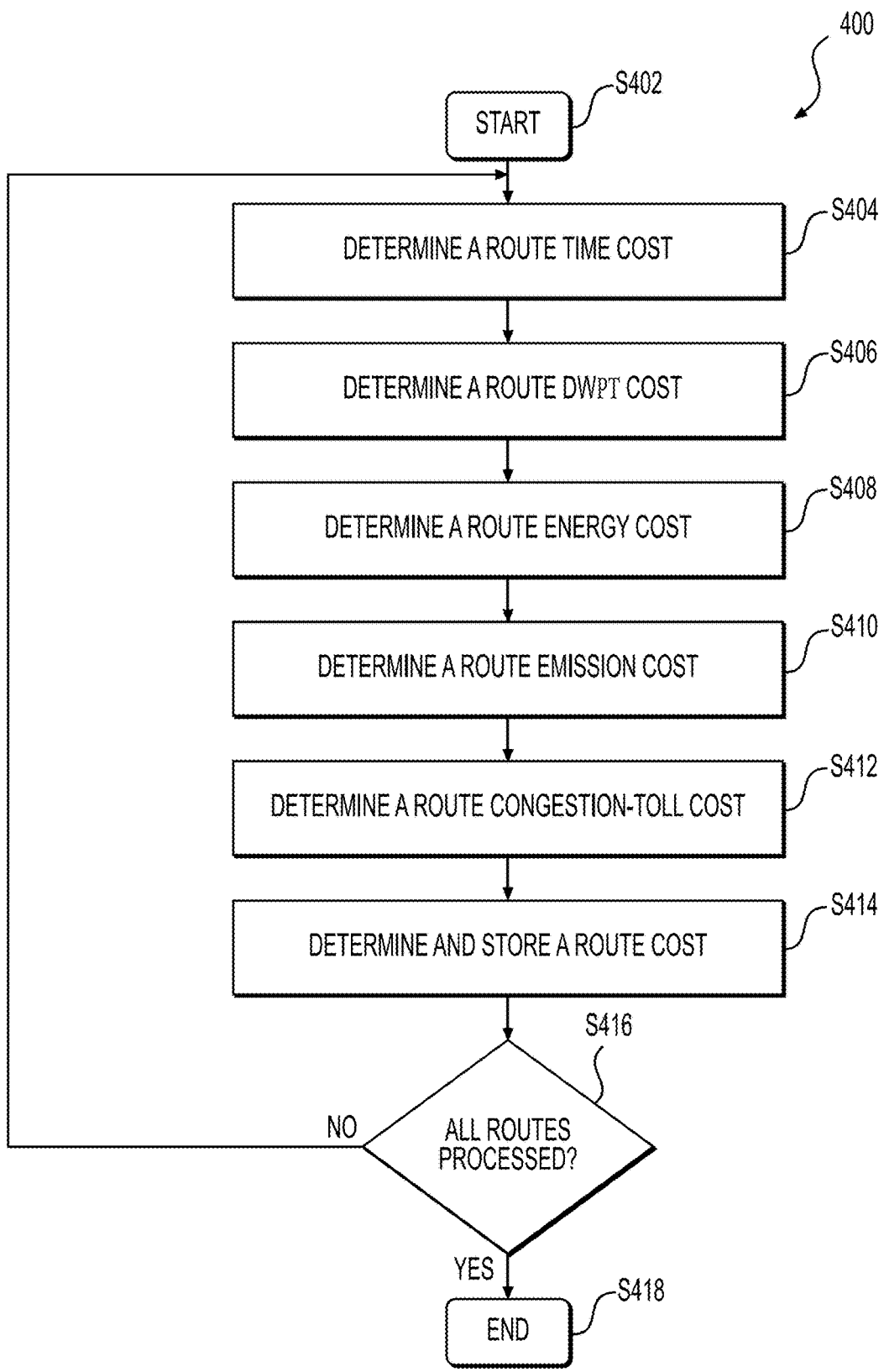
FIG. 4 is a flowchart outlining a method 400 to determine route costs of one or more routes according to an embodiment of the disclosure.

FIG. 3 is a flowchart outlining a method 300 to determine routing factors for one or more segments according to an embodiment of the disclosure. The method 300 can be used to determine a segment driving time, a segment DWPT time, segment energy, and one or more segment emission masses.

The method 300 starts at S302. At S302, $N_S$ ($N_S \geq 1$) segments can be determined based on a current location of a vehicle and a destination. Note that each one of the k routes consists of a subset or all of the $N_S$ segments. Memory can be allocated for the segment factors of all $N_S$ segments. A number of processed segments, $N_p$, the segments that have been processed by steps S304 to S310, is set to zero.

At S304, a segment driving time can be determined using a routing information and a map database. In one embodiment, the segment driving time can be the ratio of a distance L of the segment over a speed V of the segment. The speed of the segment can be the maximum speed of the vehicle or the speed limit of the segment, whichever is smaller. When real-time traffic information is used, the speed of the segment can be reduced if the traffic of the segment is slower than the maximum speed of the vehicle and the speed limit of the segment. The distance L of the segment can be determined using a map database.

A segment DWPT factor is used to promote the usage of DWPT enabled segments by vehicles enabled to use and needing DWPT. The segment DWPT factor is also used to discourage vehicles not using DWPT from travelling on DWPT enabled segments. At S306, a segment DWPT factor is represented by a segment DWPT time. The segment DWPT time can be determined using routing information and a segment driving time determined at S304. If a vehicle not using DWPT travels on a DWPT enabled segment or a vehicle enabled to use and needing DWPT travels on a non-DWPT enabled segment, the segment DWPT time can be the same as the segment driving time. Otherwise, the segment DWPT time is zero.

At S308, segment energy can be determined using mathematical models based on the vehicle characteristics, the speed V and distance L of the segment, and the like. For example, the energy that an AEV consumes in a segment can be determined using $$E_{segment} = 0.2\left[1 + \left(\frac{V}{75} - 1\right)^2\right]L,$$

where the units for V, L, and $E_{segment}$ are kilometer/hour (km/h), km, and kWh, respectively. In other example, the energy that a gasoline powered vehicle consumes in a segment can be determined using $$E_{segment} = 0.06\left[1 + \left(\frac{V}{100} - 1\right)^2\right]L,$$

where the units for V, L, and $E_{segment}$ are km/h, km, and liter, respectively.

At S310, a segment emission factor is represented by one or more segment emission masses. The one or more segment emission masses can be determined based on routing information. If the segment is not an emission segment or the vehicle is a zero emission vehicle, there is one segment emission mass of zero. If the segment is an emission segment and the vehicle emits $N_e$ ($N_e \geq 1$) emissions, there are $N_e$ segment emission masses such as $M_{segment,1}$, $M_{segment,2}$, ..., and $M_{segment,N_e}$. In one embodiment, an emission mass can be related to a segment energy as $M_{segmnt,i} = e_i E_{segment}$ where $e_i$ is a constant specific to an emission i.

At the end of steps S304 to S310, a segment driving time, a segment DWPT factor, segment energy, a segment emission factor can be stored respectively in a memory 108.

Note that a segment driving time, a segment DWPT factor, a segment energy, and a segment emission factor can be determined using an order that is different from S304 to S310. When additional routing factors such as vehicle conditions need to be included in a route cost, additional steps can be included in method 300. When fewer routing factors need to be included in a route cost, a subset of steps S304 to S310 can be excluded in method 300. For example, if a route cost is a weighted summation of a route time and a route DWPT factor, steps S308 and S310 can be excluded. In another embodiment, when fewer routing factors need to be included in a route cost, the excluded routing factors can still be determined using method 300. The associated weights for the excluded routing factors will be set to zero when determining the route cost. In another embodiment, multiple steps such as S304 and S308 can be implemented simultaneously with parallel processing. Segment factors from different segments can also be determined simultaneously with parallel processing. The parallel processing can be implemented using software and/or hardware.

At S312, the number of processed segments $N_p$ is increased by one. The number of segments $N_S$ is compared with the number of processed segments $N_p$. If $N_S$ is larger than $N_p$, go to S304 and process a next segment. If $N_S$ is equal to $N_p$, go to S314. Then the method proceeds to S314 and terminates.

FIG. 4 is a flowchart outlining a method 400 to determine route costs of the k routes according to an embodiment of the disclosure. The method starts at S402. At S402, the k routes each consisting of a subset of $N_S$ segments are available, one or more segment factors such as the segment driving time, the segment DWPT factor, the segment energy, and the segment emission factor of all $N_S$ segments are available.

At S404, a route time cost can be determined using the segment driving times determined and routing information. A route driving time can be determined by summing all segment driving times in the route. In one embodiment, a route non-driving time can be a user preference including one or more durations such as an amount of time at a resting area. In another embodiment, one or more battery charging durations for an AEV at one or more charging stations can be determined based on a charging power, a charging efficiency, and an amount of energy charged at each charging station. The route time is the summation of the route driving time and the route non-driving time. The route time cost can be determined by multiplying the route time and a time weight.

At S406, a route DWPT cost can be determined using a weighted summation of all segment DWPT factors. The weights are the associated DWPT weights. In another embodiment, if a portion or all of a route non-driving time occurs in one or more DWPT segments, the DWPT cost due to the route non-driving time can be added to the route DWPT cost.

At S408, a route energy cost can be determined using the segment energies, vehicle characteristics, energy weights, and the like. Maximum vehicle energy $E_{max}$ is the maximum amount of energy that the vehicle can store. Minimum vehicle energy $E_{min}$ is the minimum amount of energy that the vehicle is required to maintain in a route. $E_{min}$ ($E_{min} \geq 0$) is a user preference. Initial vehicle energy $E_{init}$ is the initial amount of energy that the vehicle has at a current location. How to determine a route energy cost in three cases are discussed below.

In the first case, $E_{init} \geq E_{route} + E_{min}$. Therefore, the initial vehicle energy can supply the route energy and maintain at least the minimum vehicle energy throughout the entire route. No energy needs to be added to the vehicle. The route energy cost can be determined based on the route energy and an initial energy weight $\beta_{energy,0}$. $\beta_{energy,0}$ can be a unit price of the energy stored in a memory when the vehicle was last filled or charged, a user preference, and the like.

In the second case, $E_{init} < E_{route} + E_{min}$ and $E_{init} \geq E_{route}$. Therefore, the initial vehicle energy can supply the route energy, but cannot maintain the minimum vehicle energy throughout the entire route. Energy needs to be added to the vehicle. The route energy cost can be determined based on the route energy and an initial energy weight $\beta_{energy,0}$.

In the third case, the initial vehicle energy is less than the route energy. An input energy needs to be added to the vehicle. A first portion of the input energy and the initial vehicle energy supply the route energy. A second portion of the input energy can be used to maintain the minimum vehicle energy. In one embodiment, no DWPT occurs in the route. Instead, the vehicle can be filled or charged $N_f$ times ($N_f \geq 1$) along the route at $N_f$ stations. The route energy cost can be determined based on $E_{init}$, $E_{route}$, the initial energy weight $\beta_{energy,0}$ and a subset or all of $N_f$ current energy weights. The $N_f$ current energy weights can be the unit prices of the energy at the $N_f$ stations along the route or user preferences. A subset or all of the $N_f$ current energy weights can also be an average of a subset or all of the unit prices of the energy at the $N_f$ stations along the route. In another embodiment, the vehicle can be charged via DWPT at $N_{DWC}$ DWPT enabled segments ($N_{DWC} \geq 1$). In addition, the vehicle can also be charged $N_f$ times ($N_f \geq 0$) along the route at $N_f$ stations. The amount of energy charged via DWPT and the $N_{DWC}$ DWPT segments responsible for the DWPT can be determined based on user preferences and the route DWPT capacity. A user preference can be a ratio specifying the percentage of the input energy via DWPT, a preference for a lowest energy cost, and the like. The route DWPT capacity is the total amount of energy that can be charged via DWPT in the route. The route energy cost can be determined by a weighted summation of $E_{init}$, energies charged in a subset or all of the $N_{DWC}$ DWPT segments, and energies charged at a subset or all of $N_f$ charging stations. The weights are the initial energy weight $\beta_{energy,0}$, $N_{DWC}$ current DWPT energy weights, and $N_f$ current energy weights. $N_{DWC}$ current DWPT energy weights can be the unit prices of DWPT of the $N_{DWC}$ DWPT segments, respectively. A subset or all of the $N_{DWC}$ current energy weights can also be an average of a subset or all of the unit prices of DWPT of the $N_{DWC}$ segments or all of the DWPT segments in the route. $N_f$ current energy weights can be the unit prices of the energy at the $N_f$ stations along the route or user preferences. A subset or all of the $N_f$ current energy weights can also be an average of a subset or all of the unit prices of the energy at the N stations along the route.

If the vehicle needs to get fuels or charged in the route at least once, the most recent unit price for the energy is stored in a memory to replace the initial energy weight $\beta_{energy,0}$ at the end of S408.

At S410, a route emission cost can be determined. In one embodiment, when an emission vehicle emits $N_e$ ($N_e \geq 1$) emissions, the route emission mass of emission i $M_{route,i}$ is the summation of all segment emission masses $M_{segment,i}$. The route emission cost can be the weighted summation of $N_e$ route emission masses.

At S412, a route congestion-toll cost is the summation of all the congestion fees and tolls in the route.

At S414, the route cost can be determined by summing the route time cost, the route DWPT cost, the route energy cost, the route emission cost, and the route congestion-toll cost. The route cost can be stored in a memory 108.

Note that a route time cost, a route DWPT cost, a route energy cost, a route emission cost, and a route congestion-toll cost can be determined using an order that is different from S404 to S412. When additional routing factors such as vehicle conditions need to be included in a route cost, additional steps can be included between S402 and S414. When fewer routing factors need to be included in a route cost, a subset of steps S404 to S412 do not need to be included in method 400. For example, if a route cost is a weighted summation of a route time and a route DWPT factor, steps S408 and S412 can be ignored. In another embodiment, when fewer routing factors need to be included in a route cost, the excluded routing factors can still be determined for each segment using method 300. The associated weights for the excluded routing factors will be set to zero when determining the route cost in method 400. In another embodiment, multiple steps such as S404 and S408 can be implemented simultaneously with parallel processing. Route costs of different routes can also be determined simultaneously with parallel processing. The parallel processing can be implemented using software and/or hardware.

At S416, the number of processed routes is increased by one. The number of routes k can be compared with the number of processed routes. If k is larger than the number of processed routes, go to S404 and start processing the next route. If k is equal to the number of processed routes, go to S418. Then the method proceeds to S418 and terminates.

Methods 300 and 400 can be implemented by processing circuitry 102. Methods 300 and 400 show one embodiment to determine a route cost. Other methods can also be used to determine a route cost. In one embodiment, segment factors such as segment driving times of each segment that contribute to one or more of the k routes do not need to be determined and saved separately. Instead, each route driving time can be determined by adding the ratio of a segment distance L over a segment speed V of all the segments in the route. A route time cost can be determined based on the route driving time, a route non-driving time, and a time weight. In another embodiment, a route cost based on a routing factor can be determined directly. For example, an emission vehicle emits one emission with an emission weight of $\gamma_i$, where i represents the ith segment in a route. The route emission cost can be determined by adding $M_{segment,i}\gamma_i$ over all segments in the route where $M_{segment,i}$ is the emission mass of the ith segment.

The instructions can be stored on a non-transitory computer readable storage medium that processing circuitry 102 can access. The non-transitory storage medium can be a mechanical disk such as a magnetic disk and an optical disk, a flash memory, and the like. The non-transitory storage medium can be the memory 108.

FIG. 5 shows an example 500 according to an embodiment of the disclosure. Five different vehicles A, B, C, D, and E are routed from a current location 502 to a destination 504. Three routes R1, R2, and R3, are identified (k=3). There are nine segments S1 to S9 ($N_s$=9). R1 consists of segments S1 to S3. R2 consists of segments S4 to S6. R3 consists of segments S7 to S9.

The vehicle characteristics and user preferences are listed in Table 1. The names, energy sources, the DWPT charging power, time weights, DWPT weights of the vehicles are listed in columns 1 to 5. The road characteristics of each segment are listed in Table 2. The names, the distances, the speed limits, the DWPT output power, the DWPT weights imposed on vehicles not using DWPT, the emission weight of carbon dioxide, the congestion-toll fee of each segment are shown in columns 1 to 7.

Vehicles A to D do not get filled or charged in a route. Vehicle E is charged via DWPT when the vehicle E travels on a DWPT enabled segment. The energy weight for gas is 0.67 $/liter. The energy weight for charging at a charging station and via DWPT are 0.1 $/kWh and 0.15 $/kWh, respectively. The DWPT charging efficiency is 90%. A DWPT factor is represented by a DWPT time. Note that the vehicles A and B are emission vehicles; the vehicles C to E are zero emission vehicles. An emission factor is represented by an emission mass of $CO_2$ when the vehicles A and B traveling on S3, S6, and S9.

In this example, a segment driving time, a segment DWPT time, a segment energy, and a segment emission mass of S1 to S9 for vehicles A to E are determined using the method 300 (FIG. 3). Note that the energy that vehicle A or vehicle B consumes in a segment is determined using $$E_{segment} = 0.06\left[1 + \left(\frac{V}{100} - 1\right)^2\right]L,$$

where the units for V, L, and $E_{segment}$ are km/h, km, and liter, respectively. The energy that vehicle C, vehicle D, or vehicle E consumes in a segment is determined using $$E_{segment} = 0.2\left[1 + \left(\frac{V}{75} - 1\right)^2\right]L,$$

where the units for V, L, and $E_{segment}$ are kilometer/hour (km/h), km, and kWh, respectively. The route time cost, the route DWPT cost, the route energy cost, the route emission cost, and the route congestion-toll cost are determined by the method 400 (FIG. 4). Note that the route non-driving time is set to be zero. The route energy cost of vehicle E includes a weighted summation of energies charged to the vehicle E in DWPT segments (S408 in FIG. 4). The amount of energy charged in a DWPT segment can be determined based on a DWPT charging power and a segment time. The DWPT charging power can be determined based on the output power of a DWPT segment, the DWPT charging power of vehicle E, and the DWPT charging efficiency. The route with a lowest route cost will be selected.

TABLE 1

Vehicle characteristics and user preferences

| Vehicle | Energy source | DWPT charging power [kW] | Time weight [$/min] | DWPT weight [$/min] |
|---|---|---|---|---|
| A | Gasoline | 0 | 0.05 | 0 |
| B | Gasoline | 0 | 0.2 | 0 |
| C | non-DWPT enabled AEV | 0 | 0.15 | 0 |
| D | DWPT enabled AEV | 3 | 0.05 | 0.25 |
| E | DWPT enabled AEV; DWPT charging | 3 | 0.1 | 0.25 |

Table 3 shows the route costs of R1 to R3 for vehicles A to E. The unit of the route costs is US dollar. Vehicles A and B have identical characteristics except that vehicle B has a larger time weight than that of vehicle A indicating that a user of vehicle B has a stronger preference of a faster route time than a user of vehicle A. Table 3 shows that vehicle A selects the shortest route R2 while vehicle B selects the fastest route R3. Because vehicles C and D do not need charging, they have identical characteristics except that vehicle C has a larger time weight than that of vehicle D. Therefore, vehicle C selects the fastest route R3 while vehicle D selects the shortest route R2. Vehicle D and E are DWPT enabled AEVs having identical characteristics except that vehicle D does not need charging and vehicle E needs DWPT. Therefore, vehicle D selects the shortest route R2 while vehicle E selects the route with largest DWPT charging power R1.

TABLE 2

Road characteristics

| Segment # | Distance [km] | Speed limit [km/h] | Output power [kW] | DWPT weight [$/min] | Emission weight [$/kg] | Congestion fee/Toll [$] |
|---|---|---|---|---|---|---|
| 1 | 2 | 40 | 0 | 0 | 0 | 0 |
| 2 | 8 | 50 | 5 | 0.25 | 0 | 0 |
| 3 | 2 | 30 | 2 | 0.1 | 1 | 2 |
| 4 | 3 | 50 | 0 | 0 | 0 | 0 |
| 5 | 10 | 50 | 0 | 0 | 0 | 0 |
| 6 | 2 | 40 | 2 | 0.1 | 1 | 2 |
| 7 | 4 | 50 | 0 | 0 | 0 | 0 |
| 8 | 12 | 120 | 0 | 0 | 0 | 0.5 |
| 9 | 2 | 50 | 2 | 0.1 | 1 | 2 |

TABLE 3

Route costs of vehicles A to E

|  | A | B | C | D | E |
|---|---|---|---|---|---|
| R1 | 6.56 | 9.05 | 7.57 | 5.91 | 4.72 |
| R2 | 4.29 | 7.08 | 5.43 | 3.57 | 8.10 |
| R3 | 4.50 | 6.48 | 5.18 | 3.86 | 6.98 |

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

The invention claimed is:

1. An apparatus for routing a vehicle, comprising:
processing circuitry configured to:
receive a current location of the vehicle, routing information including a destination and at least a dynamic wireless power transmission (DWPT) characteristic of the vehicle, and a map database;
generate one or more routes between the current location and the destination;
determine a route cost for each one of the one or more routes wherein the route cost includes a weighted summation of multiple routing factors including a route time and at least a route DWPT factor, and weights including a DWPT weight, the route DWPT factor and the DWPT weight being (i) a first DWPT factor and a first DWPT weight when the vehicle does not use DWPT and the vehicle travels on DWPT enabled roads and (ii) a second DWPT factor and a second DWPT weight when the vehicle is enabled to use and needs DWPT but travels on non-DWPT enabled roads;
select a route out of the one or more routes based on route selection criteria; and
cause the vehicle to charge when the vehicle is enabled to use DWPT and travels on a DWPT enabled road based on the route of the one or more routes,
wherein the multiple routing factors used to determine the route cost are selected to encourage vehicles enabled to use and needing DWPT to travel on DWPT enabled roads and to discourage vehicles not using DWPT from traveling on DWPT enabled roads, the multiple routing factors including a fee.

2. The apparatus of claim 1, wherein the processing circuitry is further configured to calculate the route time based on at least one of a maximum speed of the vehicle and real-time traffic information.

3. The apparatus of claim 1, wherein the route cost includes a route DWPT cost that is one of: (i) a first route DWPT cost based on the first DWPT factor and the first DWPT weight when the vehicle does not use DWPT and the vehicle travels on DWPT enabled roads and (ii) a second route DWPT cost based on the second DWPT factor and the second DWPT weight when the vehicle is enabled to use and needs DWPT and the vehicle travels on non-DWPT enabled roads.

4. The apparatus of claim 1, wherein the route cost includes a route emission cost that has a fee imposed on the vehicle in a case when the vehicle emits emissions that are associated with the fee and the vehicle moves in a road associated with an emission weight.

5. The apparatus of claim 4, wherein the emissions include carbon dioxide, ozone, carbon monoxide, or mononitrogen oxides.

6. The apparatus of claim 1, wherein the route cost further includes at least one of the following:
a route energy cost based on a weighted summation of energy spent for each segment in the route; and
a route congestion-toll cost that includes congestion fees and tolls occurred in the route.

7. The apparatus of claim 1, wherein k shortest path routing algorithms are used to generate the one or more routes between the current location and the destination.

8. The apparatus of claim 1, wherein the apparatus includes a receiver that receives positioning information from satellites positioning system and calculates the receiver's current location.

9. A method of routing a vehicle, comprising:
receiving a current location of the vehicle, routing information including a destination and at least a dynamic wireless power transmission (DWPT) characteristic of the vehicle, and a map database;
generating one or more routes between the current location and the destination;
determining a route cost for each one of the one or more routes wherein the route cost includes a weighted summation of multiple routing factors including a route time and at least a route DWPT factor, and weights including a DWPT weight, the route DWPT factor and the DWPT weight being (i) a first DWPT factor and a first DWPT weight when the vehicle does not use DWPT and the vehicle travels on DWPT enabled roads and (ii) a second DWPT factor and a second DWPT weight when the vehicle is enabled to use and needs DWPT but travels on non-DWPT enabled roads;
selecting a route out of the one or more routes based on route selection criteria; and
causing the vehicle to charge when the vehicle is enabled to use DWPT and travels on a DWPT enabled road based on the route of the one or more routes,
wherein the multiple routing factors used to determine the route cost are selected to encourage vehicles enabled to use and needing DWPT to travel on DWPT enabled roads and to discourage vehicles not using DWPT from traveling on DWPT enabled roads, the multiple routing factors including a fee.

10. The method of claim 9, wherein generating the one or more routes comprises generating the one or more routes between the current location and the destination using k shortest path routing algorithms.

11. The method of claim 9, further comprising:
calculating the route time based on at least one of a maximum speed of the vehicle and real-time traffic information.

12. The method of claim 9, wherein the route cost includes a route DWPT cost that is one of: (i) a first route DWPT cost based on the first DWPT factor and the first DWPT weight when the vehicle does not use DWPT and the vehicle travels on DWPT enabled roads and (ii) a second route DWPT cost based on the second DWPT factor and the second DWPT weight when the vehicle is enabled to use and needs DWPT and the vehicle travels on non-DWPT enabled roads.

13. The method of claim 9, wherein the route cost includes a route emission cost that has a fee imposed on the vehicle in a case when the vehicle emits emissions that are associated with the fee and the vehicle moves in a road associated with an emission weight.

14. The method of claim 13, wherein the emissions include carbon dioxide, ozone, carbon monoxide, or mononitrogen oxides.

15. The method of claim 9, wherein the route cost further includes at least one of the following: a route energy cost based on a weighted summation of energy spent for each segment in the route and a route congestion-toll cost that includes congestion fees and tolls occurred in the route.

16. A non-transitory computer readable storage medium having instructions stored thereon that when executed by processing circuitry causes the processing circuitry to perform a method, the method comprising:
receiving a current location of the vehicle, routing information including a destination and at least a dynamic wireless power transmission (DWPT) characteristic of the vehicle, and a map database;

generating one or more routes between the current location and the destination;

determining a route cost for each one of the one or more routes wherein the route cost includes a weighted summation of multiple routing factors including a route time and at least a route DWPT factor, and weights including a DWPT weight, the route DWPT factor and the DWPT weight being (i) a first DWPT factor and a first DWPT weight when the vehicle does not use DWPT and the vehicle travels on DWPT enabled roads and (ii) a second DWPT factor and a second DWPT weight when the vehicle is enabled to use and needs DWPT but travels on non-DWPT enabled roads; and selecting a route out of the one or more routes based on route selection criteria; and causing the vehicle to charge when the vehicle is enabled to use DWPT and travels on a DWPT enabled road based on the route of the one or more routes, wherein the multiple routing factors used to determine the route cost are selected to encourage vehicles enabled to use and needing DWPT to travel on DWPT enabled roads and to discourage vehicles not using DWPT from traveling on DWPT enabled roads, the multiple routing factors including a fee.

17. The non-transitory computer readable storage medium of claim 16, wherein the method further comprises calculating the route time based on at least one of a maximum speed of the vehicle and real-time traffic information.

18. The non-transitory computer readable storage medium of claim 16, wherein the route cost further includes at least one of the following:

a route energy cost based on a weighted summation of energy spent for each segment in the route and a route congestion-toll cost that includes tolls and congestion fees occurred in the route.

19. The non-transitory computer readable storage medium of claim 16, wherein generating the one or more routes comprises generating the one or more routes between the current location and the destination using k shortest path routing algorithms.

* * * * *